United States Patent [19]

Klees

[11] 4,448,019

[45] May 15, 1984

[54] TURBINE BYPASS TURBOJET WITH MID-TURBINE REINGESTION AND METHOD OF OPERATING THE SAME

[75] Inventor: Garry W. Klees, Mercer Island, Wash.

[73] Assignee: The Boeing Company, Seattle, Wash.

[21] Appl. No.: 306,652

[22] Filed: Sep. 29, 1981

Related U.S. Application Data

[63] Continuation-in-part of Ser. No. 890,364, Mar. 27, 1978, Pat. No. 4,294,068.

[51] Int. Cl.³ .............................................. F02F 3/02
[52] U.S. Cl. ..................................... 60/204; 60/262; 60/39.17; 60/39.25
[58] Field of Search .............. 60/204, 226 A, 226 B, 60/226 R, 236, 262, 39.23, 39.25, 39.17

[56] References Cited

U.S. PATENT DOCUMENTS

| | | | |
|---|---|---|---|
| 2,858,671 | 11/1958 | Fox | 60/39.25 |
| 3,641,766 | 2/1972 | Uehling | 60/262 |

OTHER PUBLICATIONS

May, R. J. et al., "Influence of Variable Turbine Geometry on Engine Installation & Selection", USAF Paper AFAPL-TR-73-18, Nov. 1972.

*Primary Examiner*—Carlton R. Croyle
*Assistant Examiner*—Donald E. Stout
*Attorney, Agent, or Firm*—Hughes, Barnard & Cassidy

[57] ABSTRACT

A supersonic two spool turbojet engine capable not only of developing sufficient power to accelerate up to supersonic cruise and maintain efficient operation at supersonic cruise, but also arranged to cruise at subsonic velocities with a relatively low specific fuel consumption. The engine is provided with a variable bypass passageway downstream of the compressor. Flow into the bypass passageway is controlled so that during low power setting the bypass passageway is closed so that all the gaseous flow is directed through the turbine. During higher power settings, the bypass passageway is opened to the extent that a selected portion of the gaseous flow is directed through the bypass passageway to bypass the first stage of the turbine section so that the corrected flow to the first turbine stage remains substantially constant for high and low power setting of the engine. The bypass flow is then directed into the area between the first and second turbine to combine with the gaseous flow passing through the first turbine and pass through the second turbine.

22 Claims, 8 Drawing Figures

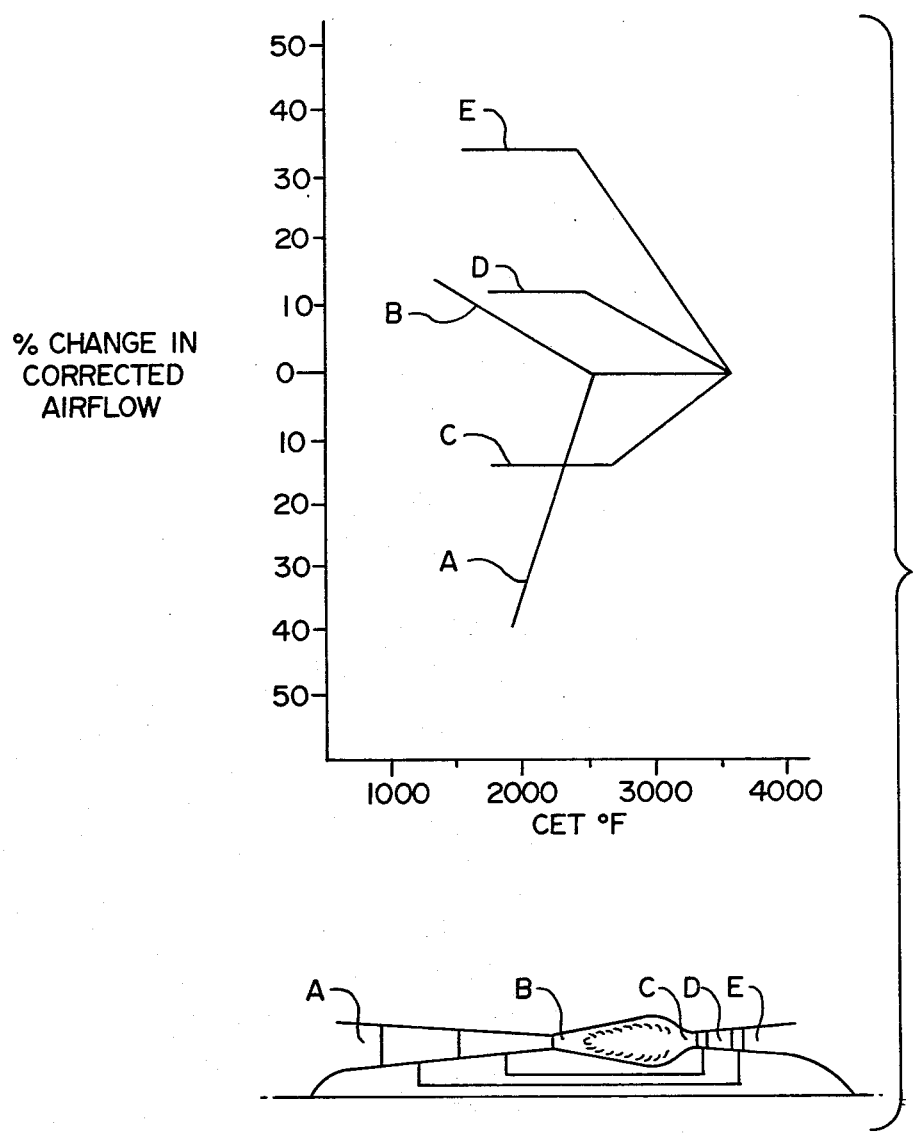
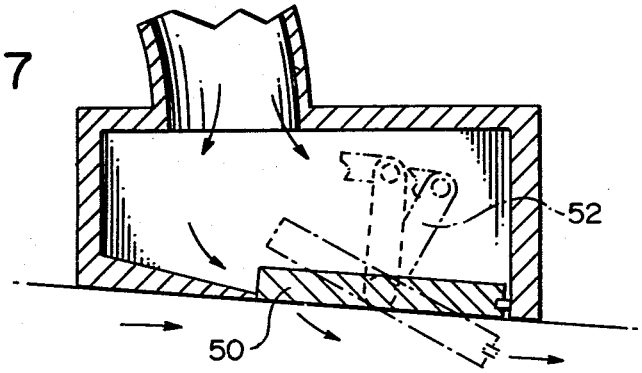
FIG. 6B
FIG. 7

TURBINE BYPASS TURBOJET WITH MID-TURBINE REINGESTION AND METHOD OF OPERATING THE SAME

CROSS REFERENCE TO RELATED APPLICATION

This is a continuation-in-part application of my pending application, Ser. No. 890,364, now U.S. Pat. No. 4,294,068, filed Mar. 27, 1978, entitled "Supersonic Jet Engine and Method of Operating the Same".

TECHNICAL FIELD

The present invention relates to a turbojet engine capable of operating effectively at both supersonic and subsonic velocities, and to a method of operating such an engine.

Background Art

There has long been a requirement for an aircraft which is capable of operating effectively in the supersonic range, and yet have the capability of cruising subsonically with a relatively low specific fuel consumption. With regard to military aircraft, it is necessary that the aircraft be capable of developing very high thrusts for acceleration and operation in the high supersonic range. Yet, for many mission requirements, such as remaining aloft for long periods of time or traveling to and from the areas where the mission is to be carried out, it is desirable that the aircraft be capable of extended subsonic cruise with low specific fuel consumption. With regard to supersonic jet transport, the aircraft must of course be capable of efficient operation at supersonic cruise. However, for extended flight over populated land masses, where the aircraft is required to travel subsonically to avoid the effect of the supersonic boom over such populated areas, the aircraft should also have the capability of operating with low specific fuel consumption.

The problem arises in that when an engine has its operating components matched with one another to operate effectively at high power settings for acceleration and supersonic cruise, the same matching of engine components does not necessarily lend itself for efficient operation at subsonic cruise. At very high thrust settings, the engine necessarily burns fuel at a relatively high rate of consumption and developes combustion exit temperatures in the range of 2800° F. which are forecast for commercial airplanes in the next decade. This necessarily means a relatively high corrected flow through the turbine, and the compressor and turbine must be matched so that the turbine can accept this high corrected flow. However, for subsonic cruise, the rate of fuel consumption should be substantially less, and the combustion exit temperatures should be substantially lower to obtain low specific fuel consumption, possibly in the range of 1700° F. to 1900° F. Under these operating conditions, the engine components which were matched for effective performance at the high power settings with high combustion exit temperatures, are generally not properly matched for efficient operation at the lower power settings of subsonic cruise.

This problem has long been recognized in the prior art, and one possible solution which has been given consideration is the use of a variable area turbine in a supersonic engine. With the variable area turbine, the angle of the stator blades is changed for different operating modes. The blades are moved to a more open position to create a greater turbine nozzle area when the engine is generating greater thrust and thus developing higher combustion exit temperatures, and the stator blades of the turbine area are moved to a more closed position where there is less nozzle area for operation at lower combustion exit temperatures where lower thrust is developed.

This concept of a variable area turbine was analyzed in a paper entitled "Influence of Variable Turbine Geometry of Engine Installation Losses and Cycle Selection", authored by Robert J. May, Jr. and W. F. Zavatsky. This report is designated "AFAPL-TR-73-18" and was presented at a propulsion joint specialists' conference in New Orleans Nov. 27–Dec. 1, 1972. The report concludes that because variable turbine geometry improves the off-design performance, engines incorporating this feature provide good performance over a much broader range of operating conditions. Thus, it is stated in this paper that airplanes designed for a specific mission but incorporating variable turbine geometry engines, will have flexibility to provide good performance for a wide variety of alternate missions.

Three other publications analyzing the variable area turbine concept are the following:

a. "Potential Operating Advantages of a Variable Area Turbine Turbo-Jet", authored by J. W. Ramsay and G. C. Oates, published by the American Society of Mechanical Engineers, United Engineering Center, 345 East 47th St., New York, N.Y. 10017, this publication having been contributed for presentation at the Winter Annual Meeting of the Aerospace Division of the American Society of Mechanical Engineers at New York, Nov. 26–30, 1972.

b. A publication entitled "Experience with a One-Stage Variable Geometry Axial Turbine" by J. Hourmouziadis, K. Hagemeister, O. Rademacher and H. Kolben, Motoren-und Turbinen-Union Munchen GmbH, Dachauer Str. 665, 8000 Munchen 50, Germany.

c. a document entitled "A Paper to be Submitted to the AGARD PROPULSION AND ENERGETICS PANEL," 48th, Meeting (Paris) Sept. 6–10, 1976, VARIABLE GEOMETRY AND MULTI-CYCLE AERO-ENGINES., authored by R. J. Latimer.

While these and other analyses have indicated certain operating advantages by use of the variable area turbine, there are still a number of problems in practical implementation of this concept in a jet engine. First, there is a lower peak efficiency due to vane cooling and profile effect and also due to end wall leakage. Also, there is a significant efficiency reduction when the vane area is opened or closed from the design setting. If there are multiple variable—stage turbines, there are rather severe structural mounting problems, and to the best knowledge of the applicant herein, a totally satisfactory solution has not been found to this problem. Further, as will be explained later herein, there are problems in matching the stages to optimize performance. Thus, while the variable area turbine may have demonstrated experimentally, it has not been proven to be economically or technically feasible on a production basis.

Disclosure of the Invention

The supersonic jet engine of the present invention is adapted to cruise at supersonic speeds at a relatively high efficiency, to operate with high turbine inlet temperatures for high power operation, and to cruise subsonically with a relatively low specific fuel comsumption. The engine comprises a housing structure having an upstream inlet end to receive intake air and a downstream exhaust air to discharge jet exhaust. There is an air inlet arranged to receive intake air.

A compressor is mounted in the housing rearwardly of the inlet and arranged to compress air flow into the inlet. The compressor has a first compressor section and a second compressor section. Each has an inlet end and an outlet end arranged to operate between a maximum compression ratio and a minimum compression ratio.

There is means defining a combustion chamber mounted in the housing downstream of the compressor to receive compressed air therefrom. Also, there is fuel injection and ignition means in the combustion chamber arranged to burn fuel in the air flow from the compressor and provide a gaseous flow from the combustion chamber.

A turbine is mounted in the housing rearwardly of the combustion chamber and arranged to receive the gaseous flow from the combustion chamber. The turbine has a first stage operatively connected to the compressor second section, and a second stage operatively connected to the compressor first section and adapted to receive gaseous flow from the first stage. Each of the first and second turbine stages have a predetermined cross sectional nozzle area through which said gaseous flow passes rearwardly through a primary exhaust passageway.

There is an exhaust nozzle to receive gaseous flow from the second turbine and exhaust the flow to ambient to produce a thrust.

Turbine bypass means is provided to receive flow at a location downstream of the compressor as bypass flow, to direct the bypass flow along a path bypassing the turbine first stage and exhaust the bypass flow to pass through the turbine second stage. Bypass valve means is provided to control the amount of flow bypassed through the turbine bypass means. There is engine control means operatively connected to the fuel injection and ignition means and to the bypass valve means, in a manner to control the amount of fuel directed to the fuel injection and ignition means and to control the bypass valve means in a manner to control the amount of bypass flow through the turbine bypass means.

The turbine stages and the compressor sections are matched in a manner that with the engine operating at subsonic cruise velocity, with the compressor sections each operating at maximum compression ratio, with the bypass valve means positioned so that there is substantially no flow through said turbine bypass means, the turbine first stage and the turbine second stage each has a flow area sized to allow gaseous flow therethrough at the speed of sound in the gaseous flow.

The engine control means is arranged to set the bypass valve means at a more open position at higher engine thrust settings where higher temperatures are created in the combustion chamber, and to set the bypass valve means at a more closed position at lower engine thrust settings where lower temperatures are created in the combustion chamber. This is done in a manner that there is substantially constant corrected gaseous flow into the first and second turbine, with corrected flow being measured according to the following formula:

$$\text{corrected gaseous flow} = \frac{W\sqrt{\theta_t}}{\delta_t}$$

where:
W = Total Mass Flow Rate in lbs. per second
$\theta_t$ = Observed temperature (absolute) divided by standard temperature (518.67° R)
$\delta_t$ = Observed pressure divided by standard pressure (2116.22 lbs./sq. ft.)

During subsonic cruise, the engine can operate at relatively low specific fuel consumption with high compression ratio and low combustion exit temperature, in a condition where the valve bypass means is at a substantially closed position. During high power acceleration mode the engine can operate at high combustion exit temperatures in a condition where the valve bypass means is in a more open position to maintain constant corrected flow through the turbine to satisfy the turbine requirements. During supersonic cruise mode the engine can operate efficiently at relatively high combustion exit temperatures with the bypass means essentially closed.

The nozzle area of the turbine should be sized to correspond approximately to the value derived from the formula for corrected flow.

In the preferred form, the turbine bypass means comprises passageway means positioned radially outwardly of the turbine first stage and arranged to discharge bypass flow in an annular pattern into flow from the first turbine stage.

In one embodiment, the turbine bypass means comprises bypass inlet means located immediately downstream of the compressor to direct a selected portion of air from the compressor into the turbine bypass means.

In another embodiment, the turbine bypass means comprises passageway means having an inlet end located relative to the combustion chamber to receive gaseous flow from the combustion chamber as at least part of the bypass flow. Desirably, the inlet end is located so that the bypass flow comprises both combustion flow from the combustion chamber and air from the compressor in a proportion that temperature of the bypass flow generally matches temperature of the gaseous flow from the turbine first stage. In the preferred form, the temperature of the bypass flow should be within about 300° F. plus or minus of the temperature of the gaseous flow of the turbine first stage.

In the method of the present invention, an engine is provided as described above. The amount of fuel directed to the fuel injection and ignition means is controlled and the setting of the bypass valve means is also controlled so that the bypass flow through the turbine bypass means maintains the corrected flow to the turbine substantially constant as described above.

Other features of the present invention will become apparent from the following detailed description.

BRIEF DESCRIPTION OF THE DRAWINGS

FIGS. 6A and 6B are graphic illustrations of, respectively, operating characteristics of the present invention and of a variable area turbine engine; and FIG. 7 illustrates one of the bypass valves employed in the first and second embodiments.

DESCRIPTION OF THE PREFERRED EMBODIMENT

Figure 1:
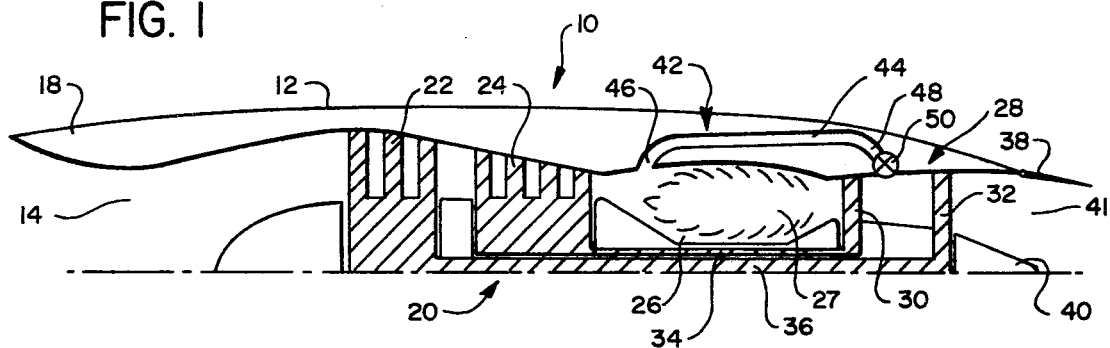
FIG. 1 is a longitudinal semi-schematic view of a first embodiment of a jet turbine engine of the present invention.

In FIG. 1 there is a schematic showing of a first embodiment of the present invention. For convenience of illustration, only the top half of the engine is shown, it being understood that the bottom half is substantially the same as the top half. The engine 10 comprises a housing 12 having a forward inlet end 14 and an aft exhaust end 16. At the inlet end 14 there is a supersonic inlet 18 which is or may be of conventional design, such as a variable geometry inlet. At supersonic speeds, this inlet functions to receive air at supersonic velocity, and reduce the velocity of air in the inlet to subsonic velocity.

Immediately aft of the inlet is a two-spool compressor 20, made up of a forward low pressure compressor section 22 and a rear high pressure compressor section 24. Immediately downstream of the compressor 20 the housing 12 defines a combustion chamber 26 in which is mounted a fuel injection and igniting device, indicated schematically at 27. Downstream of the fuel injection and igniting device 27 is a turbine 28, made up of a first high pressure stage 30 and a second low pressure stage 32. The high pressure stage 30 is operatively connected to the high pressure compressor section 24 through an outer shaft indicated at 34, and the low pressure stage 32 is operatively connected through an inner shaft, indicated at 36, to the low pressure compressor section 22. Downstream of the turbine 28 is a variable area exhaust nozzle 38, defining with a tail cone 40 an exhaust passageway 41 through which the exhaust is discharged.

At a location surrounding the combustion chamber 26 and immediately downstream of the compressor section 20, there is a turbine bypass passageway means 42. In this embodiment this passageway means 42 is shown as a plurality of passageways defined by individual tubes 44. However, within the broader aspects of the present invention, the passageway means 42 could be made in some other form. As shown herein there are a plurality of longitudinally extending bypass tubes 44, arranged in a circumerential pattern around the fuel injection and igniting device 27 and around the turbine first stage 30. In the schematic showing herein, only one tube 44 is shown, it being understood that there is a plurality of such tubes 44.

Each tube 44 has a forward entrance portion 46 located immediately downstream of the compressor 20, and a rear exit end 48 leading into the area between the two turbine stages 30 and 32. To control flow through each of the bypass tubes 44, there is provided at each exit end 48 a related bypass valve 50, shown in FIG. 7. Each valve 50 is moved between its open and closed position by an associated actuating line 52. By opening the valves 50, these tubes 44 can function to cause a portion of the air flow from the second compressor stage 24 to follow a main flow path which goes into the combustion chamber 26, and cause the remainder of the airflow to follow a bypass flow path which is through the bypass passageway means 42 (i.e., through the tubes 44). The valves 50 can be closed down to completely shut off bypass flow to permit maximum design flow through the turbine 28, or they can be moved to intermediate positions to precisely control the amount of bypass flow and thereby maintain maximum design flow through turbine 30 as combustor exit temperature changes.

Of particular significance in the present invention is the matching of the main components of the present invention, and in particular the matching the two sections 22 and 24 of the compressor 20 with the two stages 30 and 32 of the turbine 28, and also properly matching the two turbine stages 30 and 32 with one another. Let it be assumed that the engine 10 is mounted to an aircraft which is operating at subsonic cruise (i.e., traveling at a Mach number between 0.8 and 0.95). In the present invention, for this subsonic cruise mode, the two compressor stages 22 and 24 are designed to operate at maximum design compression ratio, with the engine 10 developing adequate thrust to match total drag on the aircraft (or in the case where there are multiple engines 10, to develop its proportionate share of thrust so that the several engines 10 develop sufficient thrust to overcome total subsonic drag).

In this condition, the bypass valves 50 are moved to their full closed positions so that the entire flow of air from the compressor 20 is directed through the combustion chamber 26 to the turbine first stage 30. Also, the amount of fuel that is delivered to the fuel injection and ignition device 27 is just sufficient so that the desired thrust for subsonic cruise is developed. Under these operating conditions, it is expected that the combustion exit temperature of the gases leaving the combustion chamber 26 are between approximately 1500° F. to 1700° F. Under these operating conditions, the turbine first stage 30 is designed to have a nozzle area of a size that the gaseous flow through the first stage of the turbine is at the speed of sound as in preferred or normal operation of jet engines.

To appreciate the significance of this matching of the compressor 20 and the turbine 28 for subsonic cruise, it should be indicated that as a general proposition, when the compressor is operating at a maximum compression ratio and maximum mass flow rate, a jet engine is able to produce the same thrust for a lower fuel consumption. Thus, with the compressor 20 and the turbine 28 being matched so that both sectionss of the compressor 20 are operating at maximum compression ratio and mass flow at subsonic cruise, and with all of the flow from the compressor being directed through the turbine 28, the engine 10 is able to operate at a relatively low specific fuel consumption at subsonic cruise.

Let us now consider the operating condition of the engine 10 of FIG. 1 operating at subsonic speeds and developing thrust greater than total drag so that the aircraft to which the engine 10 is mounted is in an accelerating or climbing mode of operation.

It is to be understood that since the angles of the stator blades, and therefore the turbine nozzle area of the two stages 30 and 32 of the turbine 28 are fixed, for the turbine 28 to function properly, the corrected flow through each turbine stage should be substantially constant. Corrected flow through the turbine is calculated according to the following formula:

$$\text{corrected gaseous flow} = \frac{W\sqrt{\theta_t}}{\delta_t}$$

where
W = Total Mass Flow Rate in lbs. per second
$\theta_t$ = Observed temperature (absolute) divided by standard temperature (518.67° R)
$\delta_t$ = Observed pressure divided by standard pressure (2116.22 lbs./sq. ft.)

Consideration will be given first only to the flow through the turbine first stage 34 and later there will be discussion of the flow through the turbine second stage 32, and of the matching of the two turbine stages 30 and 32. With the aircraft to which the engine 10 is mounted in an accelerating mode in the subsonic velocity range, fuel is fed to the engine 10 at its maximum rate as dictated by material strength limitations in turbine 30 to obtain maximum thrust, and this in turn results in higher temperatures being developed in the combustion chamber 26. As indicated above, in the formula for corrected flow, for the same amount of mass flow at the same pressure, the corrected flow increases at a rate proportional to the square root of the temperature. Thus the corrected flow from the combustion chamber 26 would be expected to increase with an increase in combustion exit temperature. To maintain corrected flow through the turbine first stage 30 constant, the turbine bypass valves 50 are moved toward an open position so that a portion of the airflow from the compressor 20 flows through the turbine bypass tubes 44 and out the valves 50 at a location upstream of the turbine second stage 32.

Figure 4:
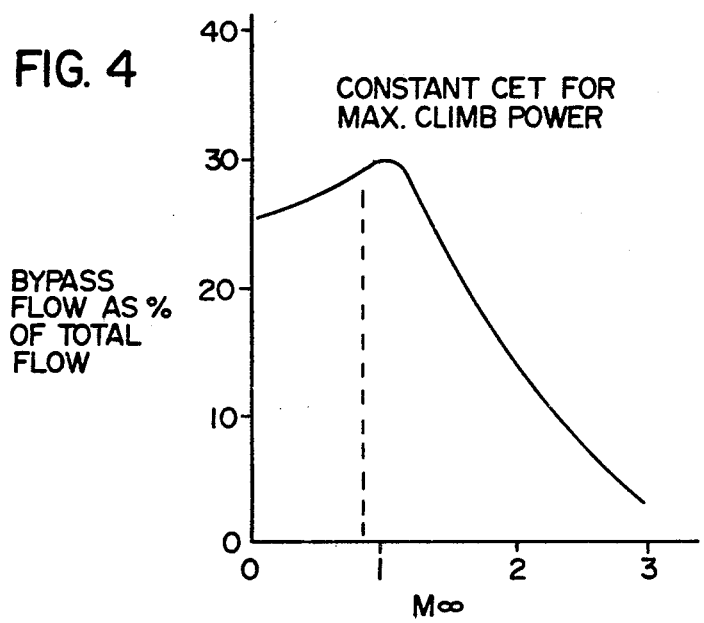
FIG. 4 is a graph where engine bypass ratio is plotted against Mach number to illustrate the operating characteristics of the present invention.

With the foregoing in mind, let us now analyze the operating characteristics of the engine 10 and the aircraft to which it is mounted when taking off from the ground, accelerating upwardly through both the subsonic and supersonic range, and finally arriving at supersonic cruise velocity. Reference is made to FIG. 4 which is a graph plotting the percentage of air which flows through the bypass passageways 44 against the airplane Mach number In plotting this graph, the following assumptions are made.

(1) Maximum temperature is used throughout climb.
(2) The turbine area is selected and optimized to give:
 (a) good subsonic specific fuel consumption,
 (b) little or no bypass at supersonic cruise.
(3) The airplane is designed for Mach 3 cruise.
(4) The overall pressure ratio is selected to give adequately low compressor exit temperature for turbine and disc cooling at Mach 3.

It can be seen that between take-off and as the aircraft is accelerating through the subsonic velocity range, the percentage of bypass flow increases to a maximum at or about the Mach 1 level, where near maximum power is needed to move the aircraft through the transonic range.

As the aircraft continues accelerating through the supersonic range, the engine 10 is still at a high power setting and developing a relatively high amount of thrust. However, as the aircraft velocity increases, the ram pressure of the air moving into the engine inlet 18 increases at a relatively high rate. Since the corrected airflow to the turbine first stage 30 decreases in proportion to the increase in pressure, the net effect is that to maintain corrected flow through the turbine 28 constant, the percentage of bypass flow is decreased as the aircraft accelerates from Mach 1 to Mach 3. When the aircraft reaches Mach 3, it is operating at supersonic cruise velocity, and the bypass air has been substantially closed down to a rate of about 5% or possibly down to zero.

Let it now be assumed that it is no longer desired to operate the aircraft at supersonic cruise and it is desired to return to subsonic cruise. In a military aircraft, this would occur when the mission has been completed and the aircraft must travel a relatively long distance back to its base. In a commercial aircraft, this situation would occur, for example, when the aircraft is beginning its course of travel over a populated land mass where supersonic cruise is unacceptable.

In this situation, less fuel is delivered to the engine 10 so that the combustion exit temperature decrease, and the corrected flow to the turbine first stage 30 would likewise decrease. Therefore, to maintain the corrected flow to the turbine first stage 30 substantially constant, if the bypass valve members 50 are slightly open, they are moved further toward their closed positions to direct a greater percentage of the total flow through the turbine first stage 30. When the aircraft is operating at subsonic cruise, the percentage of bypass flow has decreased to zero. At this point, the engine 10 is operating in the condition first described below, where the compressor 20 is operating at maximum compression ratio and mass flow, and the turbine first stage 30 is sized to accept all this flow to satisfy the turbine requirements.

Consideration will now be given to the flow through the turbine second stage 32, and also to the matching of the two turbine stages 30 and 32. The full explanation of these concepts depends upon some rather complex analyses of engine performance, and these are well beyond the scope of this presentation of the present invention. However, as a very rough generalization, it can be said that these benefits occur in the present invention for the reason that since variations in combustion exit temperature which tend to alter corrected gas flow to the turbine are compensated for by bypassing some of the gaseous flow around the turbine first stage 30 and back into the turbine second stage 32, the two stages of the turbine are able to function in a relatively narrow operating range over a relatively wide range of engine power settings. Likewise, the two compressor sections are able to function in a relatively constant operating range over a wide range of engine power settings. The net effect is that it is possible to optimize engine performance within these relatively narrow ranges of operation, even though there is a wide range of power settings.

To appreciate this particular feature, let us first examine the operating characteristics of the prior art variable area turbine concept with regard to an engine having a multiple stage turbine and a two spool compressor. First, with regard to the prior art variable area turbine concept, the stator blades must be able to be rotated about their axial length from a full open position when corrected flow is greatest, to a more closed position when corrected flow is at a minimum. To minimize losses at the operating extremes, the turbine is generally designed for peak efficiency with the blades angled at some intermediate position, with the turbine operating less efficiently at its two extreme positions.

With the two-stage variable area turbine operating at a high power setting, the blades of the first stage turbine are set at a full open position to accommodate the higher corrected flow from the combustion chamber. In this operating condition, the pressure drop and temperature drop of the gaseous flow through the turbine first stage is of a relatively smaller magnitude. Since corrected gas flow is inversely proportional to the pressure of the gas and directly proportional to the square root of the temperature, it can be seen that at this particular setting of the first stage of the turbine, the corrected flow of the gas exiting from the first stage of the turbine has not increased as greatly as it would have if the turbine first stage were operating at a setting where there was a greater pressure and temperature drop across the turbine first stage.

The effect of this is that the second turbine stage receives gaseous flow from the first turbine stage at a relatively low corrected flow. Accordingly, the blades of the second turbine stage must be moved more toward a closed position to satisfy the requirements of the turbine second stage.

To examine further the operating characteristics of the prior art variable area turbine, let it be assumed that this same engine is operating at a lower power setting where corrected flow from the combustion chamber is at a lower level. In this condition, the blades of the turbine first stage are rotated to a more closed position where there is less nozzle area, and in this position there is a relatively greater drop in both pressure and temperature of the gaseous flow through the turbine first stage. Lower working temperature in the turbine reduces the work capacity of a given mass flow. Therefore a greater temperature drop and pressure drop must be taken in the turbine to accomplish the same work. This results in relatively greater corrected flow from the outlet end of the turbine first stage. To accommodate this relative increase in corrected flow, the blades of the second stage of the turbine are moved toward a more open position.

Thus to achieve a given pressure and temperature drop across the turbine, at the high and low power settings the two turbine stage area requirements are operating opposite to one another. At the high power setting the first stage moves more toward an open position and the second stage moves to a more closed position. The opposite occurs at a low power setting. It is only at the intermediate power settings which are rarely used that both turbine stages of the variable area turbine are operating at optimum design position.

To apply a similar analysis to the present invention, maintaining corrected gas flow to the turbine first stage 30 is accomplished by controlling the amount of turbine bypass flow. Thus, even though there are rather large changes in combustion exit temperature because of the change in the engine power setting, the turbine first stage 30 receives substantially the same corrected gas flow and is thus operating within a relatively narrow range of operating conditions. However, even though the corrected flow into the turbine first stage 30 remains constant, the corrected flow from the turbine first stage 30 will vary depending upon the power setting of the engine. For low power settings where there is relatively less energy being generated in the gaseous flow from the combustion chamber 26, the turbine first stage 30 extracts a relatively high proportion of the energy in the gaseous flow in order to drive the second compressor stage 24 at maximum design compression ratio. The result is that the corrected flow from the turbine first stage 30 is at a relatively high level. On the other hand, when the engine is operating at a high power setting so as to generate more energy in the combustion gases, the turbine first stage 30 extracts a relatively lower proportion of the energy from the combustion gases passing therethrough to drive the compressor second stage 24 at its maximum design pressure ratio. The result is that at the high power setting, the corrected flow from the turbine first stage 30 is at a relatively low level (based on the assumption that corrected flow to the turbine first stage 30 remains constant).

In view of the discussion immediately above, to match the two turbine stages 30 and 32 properly in the present invention, the turbine second stage 32 is sized to accept the relatively high corrected flow from the turbine first stage 30 under conditions where both compressor stages 22 and 24 are operating at a maximum design pressure ratio and mass flow, and the engine is operating at a relatively low power setting in subsonic cruise. To compensate for what would be the lower corrected flow from the turbine first stage 30 at a high power setting (again assuming corrected flow to the turbine first stage 30 remains constant), the bypass flow around the turbine first stage 30 is directed into the area between the turbine first stage 30 and the turbine second stage 32 to add to the gaseous flow through the turbine second stage 32. The additional flow of the bypass air causes the total corrected flow to the turbine second stage 32 to be sufficiently high to substantially satisfy the requirements of the turbine second stage 32.

One of the significant advantages of the present invention is that the engine has good climb thrust under circumstances where there is high bypass flow.

A comparison of the operating characteristics of the present invention, as applied to a supersonic engine having a two spool compressor and two stage turbine, was made with respect to a comparable engine employing the variable area turbine concept also having the two spool compressor and two stage turbine. This comparison was made by analyzing the corrected flow through each engine at five different locations, indicated in the sketch accompanying FIGS. 6A and 6B, these being as follows:

a. a location immediately upstream of the compressor (indicated at "A")
b. a location immediately downstream of the compressor and upstream of the combustion chamber (indicated at "B")
c. a location at the upstream face of the turbine first stage (indicated at "C")
d. a location between the turbine first stage and turbine second stage (indicated at "D")
e. a location immediately downstream of the turbine second stage (indicated at "E").

The corrected air flow at these various locations was determined for operation at Mach 0.9, at 36,089 feet, with combustion exit temperatures ranging from approximately 1200° F. to approximately 1700° F. To provide a base line for determining increase or decrease of corrected flow at varying combustion exit temperatures, the corrected air flow at approximately 3200° F. was determined at each location for each engine, and these values were plotted at the middle base line which is at the zero level with respect to the vertical axis of the two graphs along which percentage change in corrected air flow is plotted. Therefore any values plotted above the zero base line would indicate an increase in corrected air flow from that which occurs at combustion exit temperatures of 3200° F. and any values plotted below that base line would indicate a decrease in such corrected air flow. The corrected air flow for the five locations noted above in the engine of the present invention is indicated in the graph of FIG. 6A and the corrected air flow for these same five locations in the comparable variable area turbine engine is indicated in FIG. 6B.

Figure 6A:
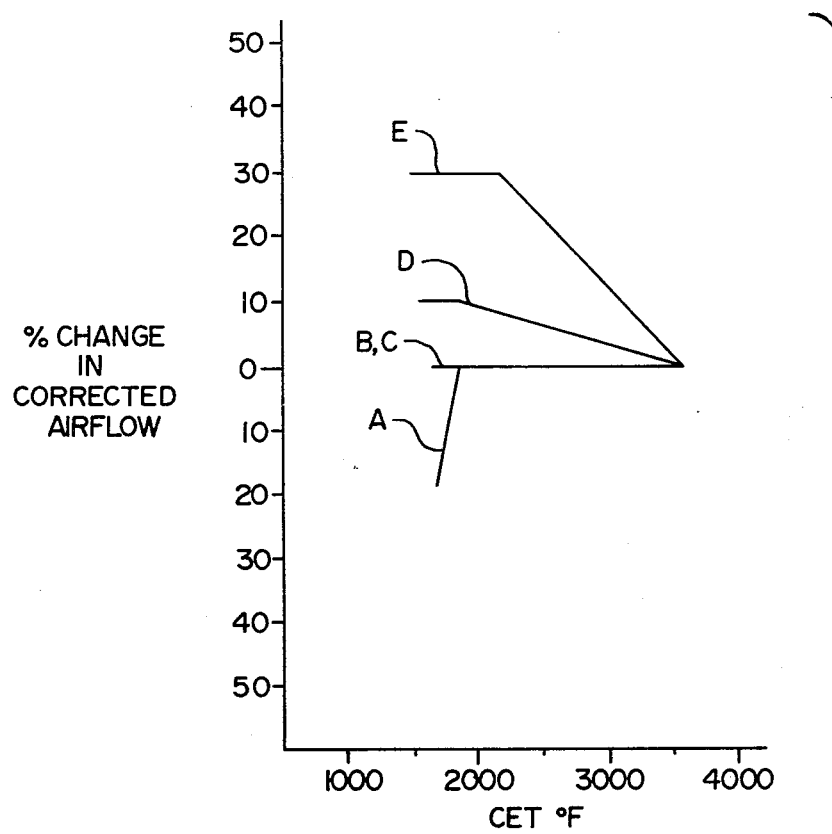
Figure 6A:
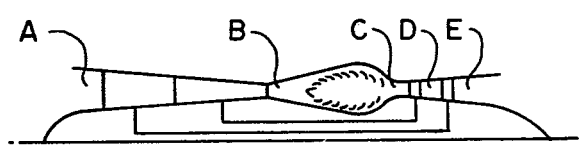

Let us first turn our attention to the operating characteristic of the engine of the present invention, as shown in FIG. 6A. First, at very low combustion exit temperatures (e.g., below 1650° F.) the corrected air flow at the face of the compressor, indicated at "A", decreases. However, at combustion exit temperatures of 1650° F. and higher, the corrected flow into the compressor remains substantially constant, which indicates maximum compression ratio and airflow, and thus best overall engine performance is obtained.

Also, in the engine of the present invention, it can be seen that throughout the entire range of combustion exit temperatures, the corrected air flow remains substantially constant at a location immediately downstream of the compressor (indicated at "B") and at the face of the turbine first stage (indicated at "C"). Thus, through a relatively wide range of power settings, both the compressor and the turbine first stage are operating under substantially constant operating conditions with respect to corrected air flow.

With regard to the corrected flow from the turbine first stage (indicated at "D"), the corrected flow is higher at lower combustion exit temperatures and lower at higher combustion exit temperatures. However, this is offset by the addition of the bypass air to the flow into the turbine second stage at higher combustion exit temperatures so that the total corrected flow into the turbine second stage is more nearly constant.

To turn our attention now to the operating characteristics of the variable area turbine engine, with reference to FIG. 6B, it can be seen that at the lower combustion exit temperatures, there is substantially lower airflow at the inlet than there is with the engine of the present invention. Also, at lower combustion exit temperatures, the corrected air flow at the face of the turbine first stage (indicated at "C") is lower than at the higher combustion exit temperatures, and the corrected airflow at the face of the turbine second stage is relatively high compared with the operation at higher combustion exit temperatures. Thus, as indicated earlier herein, with the variable area turbine engine, when operating at lower combustion exit temperatures, the turbine first stage must be moved to a more closed position, while the turbine second stage must be moved to a more open position, and with higher combustion exit temperatures, the blades of the two turbine stages must be moved to opposite positions.

Also, it can be seen that with the variable area turbine engine, at low combustion exit temperatures, the corrected air flow immediately downstream of the compressor is somewhat higher than at higher combustion exit temperatures. This would indicate that the compression ratio of the compressor would be lower for the variable area turbine engine at low combustion exit temperatures. This, along with the fact that there is less mass flow into the compressor at low combustion exit temperatures for the variable area turbine engine, indicates that in the subsonic cruise range, where combustion exit temperatures may be as low as 1650° F., the variable area turbine engine is not able to operate with the same cruise efficiency as the engine of the present invention. The design point efficiency of the variable area turbine is also lower, causing further reduction in cruise efficiency. Then the extreme position of the variable area turbine also causes further reduction in turbine efficiency and cruise efficiency.

Figure 5:
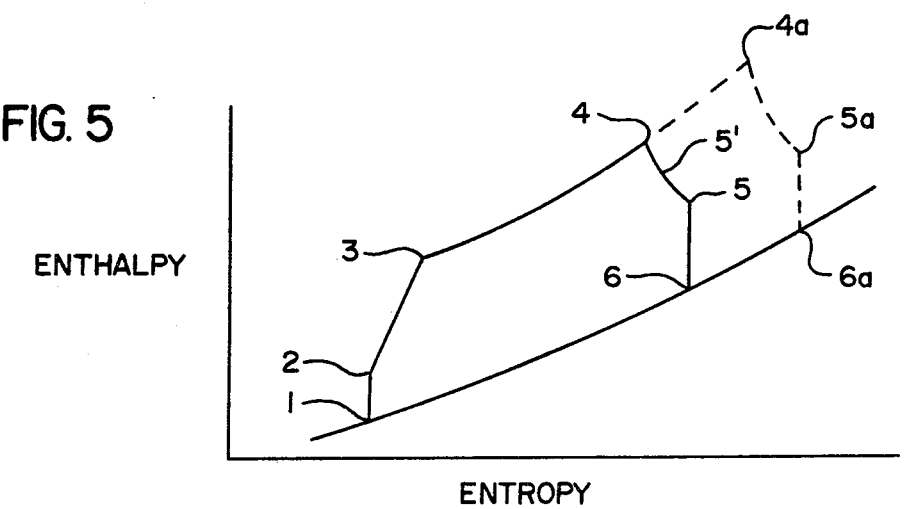
FIG. 5 is an enthalpy-entropy diagram illustrating operating characteristics of the present invention at low power and high power settings.

Reference is made now to FIG. 5, in which the operating characteristics of the engine of the present invention are disclosed where enthalpy is plotted against entropy. The solid lines in FIG. 5 represent operating characteristics at subsonic cruise, and the dotted lines indicate the operating characteristics at higher power settings during subsonic acceleration. The line segment from point 1 to point 2 indicates the rise in both pressure and temperature of the air passing into the inlet. The line segment from point 2 to point 3 represents the temperature and pressure rise of the air flowing through the compressor. The line segment from point 3 to point 4 represents the increase in temperature of the air flowing through the combustion chamber, with point 4 representing the pressure and temperature at the face of the turbine at subsonic cruise. At subsonic cruise, the temperature is assumed to be at about 1700° F., the bypass valve means is closed, and the total gaseous flow is directed through both turbine stages. The line segment from point 4 to point 5 represents the temperature and pressure drop of the gaseous flow through the two turbine stages, and the line segment from point 5 to point 6 represents the thrust developed by the gaseous flow out the exhaust nozzle.

With further reference to FIG. 5, let it be assumed that the engine is now operated at a higher power setting, as during subsonic acceleration. The line segment from points 1 to 2 and from points 2 to 3 would be nearly the same as for subsonic cruise, since flow through the compressor is substantially the same. However, since a greater amount of fuel is being directed into the combustion chamber, combustion exit temperatures are higher, and the line segment from point 3 to point 4a indicates the rise in temperature taking place in the combustion chamber. The line segment from point 4a to point 5a represents the gaseous flow through the two turbine stages, and the line segment from point 5a to point 6a represents the thrust developed by the gaseous flow from the turbine.

It should be indicated that in this operating condition since only a portion of the total gaseous flow is directed through the turbine first stage 30, there is a greater pressure and temperature drop (from point 4a to point 5a) than there would be if it were possible to direct all of the gaseous flow through the turbine first stage. However, the air which is bypassed around the turbine first stage does pass through the turbine second stage 32. Thus this bypass air does work as it passes through the turbine second stage 32 along with the combustion gases that have passed through the turbine first stage 30, and also produces a thrust as it exits through the nozzle 41, along with the rest of the exhaust. However, it should also be recognized (as illustrated in the full line showing of FIG. 5 where the conditions during subsonic cruise are illustrated) that the engine is capable of functioning very effectively at subsonic cruise with a relatively low specific fuel consumption, while still having the capability (as illustrated in the dotted lines of FIG. 5) of developing adequate thrust at higher combustion temperatures for acceleration through subsonic and supersonic range up to supersonic cruise.

Figure 3:
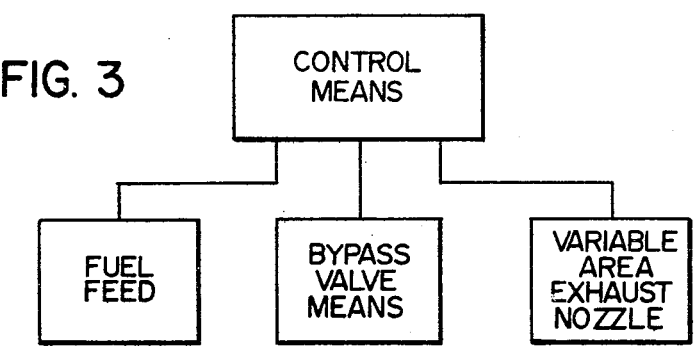
FIG. 3 is a schematic illustration of the control means for the present invention.

In FIG. 3, there is a schematic illustration of the control means of the present invention. It can be seen that the control means is operatively connected to (a) the fuel feed, (b) bypass valve means, and (c) variable area exhaust nozzle, so as to control the setting of all three components. The control means is itself made responsive to the appropriate operating characteristics of the engine. Since the manner in which this is done is well known in the prior art, this will be discussed only briefly herein. Specifically, the control means could be made responsive to the revolutions per minute of the engine, the power setting of the engine, the engine pressure ratio, the exhaust gas temperature, the compressor ratio, and the inlet total temperature.

With regard to the control means being responsive to corrected flow so as to operate the bypass valve means, to determine corrected flow it is necessary to ascertain mass flow rate, temperature and pressure. It should be understood that on conventional jet engines now in use, the instrumentation is already employed which measures these parameters. On conventional jet engines there is instrumentation which measures the revolutions per minute of each spool of the engine, the inlet total temperature and pressure, the exhaust gas total pressure and temperature, the compressor exit temperature (for each compressor stage) and also the nozzle area (which is generally calibrated to the setting of the nozzle).

With regard to measuring total airflow in the engine, this is done in the prior art already, since total airflow is one of the input variables which is used to control the fuel control apparatus so that the air fuel ratio of the engine is at the proper level. The normal way in which total airflow is measured in a jet engine is to measure three variables at the exit end of the compressor at a calibrated station at the downstream end of the compressor. These three variables are: static pressure, total pressure and temperature. From readings of these three variables, a determination of total airflow through the engine is made.

With regard to measuring temperature at the exit end of the combustion chamber, this can be done by a direct temperature measurement, such as by means of a thermo-couple. However, the more conventional means of doing this is as follows. First, a test apparatus is constructed where the combustion chamber section of the engine is set up and compressed air and fuel are fed into the combustion section of the engine. The heat energy generated at the combustion section is measured, and this is calibrated against total airflow and fuel input, which is the fuel air ratio. From this data, the temperature can be inferred as a function of the more easily measured fuel air ratio. As indicated above, this is a quite conventional means of obtaining a temperature reading at the exit end of the combustion chamber. In conventional jet engines, this reading is normally used as an indicator of temperature to prevent overheating of the engine.

With regard to obtaining a reading of absolute pressure at the exit end of the combustion chamber, this can of course be measured directly. As a practical matter, it is generally obtained as a function of flow and temperature from the test rig apparatus in the manner described in the above paragraph.

With the three readings of total airflow, absolute temperature and absolute pressure, these are simply applied to the formula for measuring corrected flow, and an appropriate value for corrected flow is derived. This value is directed to the control means to operate the bypass valve means so as to maintain corrected flow to the turbine first stage constant.

Figure 2:
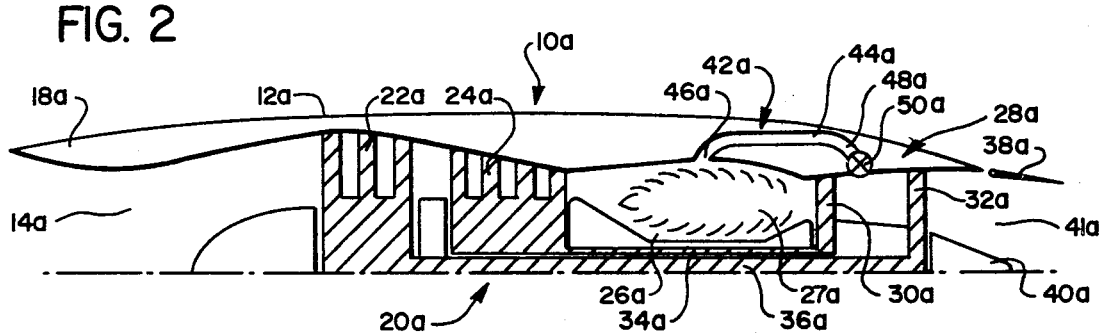
FIG. 2 is a view similar to FIG. 1 showing a second embodiment thereof.

A second embodiment of the present invention is shown in FIG. 2. Components of this second embodiment which are similar to components of the first embodiment will be given like numerical designations, with a "a" suffix distinguishing those of the second embodiment. The main components of this second embodiment are quite similar to those of the first embodiment. It can be seen that the engine 10a of FIG. 2 comprises a forward compressor 20a, comprising first and second compressor sections 22a and 24a, and a two stage turbine 28a comprising high pressure and low pressure turbine stages 30a and 32a. There is a combustion chamber 26a and a fuel injecting and igniting device 27a positioned rearwardly of the first and second compressor sections 22a and 24a. The essential difference of this second embodiment is that the bypass inlets 46a are positioned further downstream in a middle portion of the combustion chamber 26a. Thus, the bypass flow comprises a mixture of compressed air from the compressor 20a and combustion products from the combustion chamber 26a. The bypass inlets 46a are positioned so that the temperature of the bypass flow is above the temperature at the exit end of the compressor 20a, but below the temperature at the downstream end of the combustion chamber 26a. Desirably, the temperature of the bypass flow would substantially match the temperature of the flow from the turbine first stage 30a. Thus, when the bypass flow enters the area between the first and second turbine stages 30a and 32a, the possibility of thermal shock on turbine 32a is reduced. Alternatively, the turbine stages 30a and 32a can be spaced further apart to reduce temperature gradients felt by turbine 32a. Desirably the temperature of the bypass flow would be within about 300° F. of the temperature of the flow from the turbine first stage 30a.

In other respects, the operation of the second embodiment is substantially the same as that of the engine 10 of the first embodiment in that during subsonic cruise the bypass control nozzle 50a is closed to shut off flow through the bypass passageway means 42a. When the engine 10a is developing higher thrust, the turbine bypass valves 50a are opened, in the manner described with respect to the first embodiment, to maintain corrected gaseous flow to the turbine first stage 30a constant. It is believed that the other operating features of this second embodiment are readily apparent from the above explanation of the operation of the first embodiment, so no further explanation will be added.

It is apparent that various changes could be made in the apparatus method of the present invention without departing from the basic teachings thereof.

What is claimed is:

1. A supersonic jet engine adapted to cruise at supersonic speeds at a relatively high efficiency, to operate with high turbine inlet temperatures for high power operation, and to cruise subsonically with a relatively low specific fuel consumption, said engine comprising:
   a. a housing structure having an upstream inlet end to receive intake air, and a downstream exhaust end to discharge jet exhaust,
   b. an air inlet arranged to receive intake air,
   c. a compressor mounted in said housing rearwardly of said inlet and arranged to compress air flowing into said inlet, said compressor having a first compressor section and a second compressor section, each having an inlet end and an outlet end arranged to operate between a maximum compression ratio and a minimum compression ratio, d. means defining a combustion chamber mounted in said housing downstream of said compressor to receive compressed air therefrom,
e. fuel injection and ignition means in said combustion chamber arranged to burn fuel in air flow from the compressor and provide a gaseous flow from said combustion chamber,
f. a turbine mounted in said housing rearwardly of said combustion chamber and arranged to receive said gaseous flow from the combustion chamber, said turbine having a first stage operatively connected to the compressor second section, and a second stage operatively connected to the compressor first section and adapted to receive gaseous flow from said first stage, each of said first and second turbine stage having a predetermined cross-sectional nozzle area through which said gaseous flow passes to pass rearwardly through a primary exhaust passageway,
g. an exhaust nozzle to receive gaseous flow from said turbine and exhaust said flow to produce a thrust,
h. turbine bypass means to receive flow from a location downstream of said compressor as bypass flow, to direct said bypass flow along a path bypassing said turbine first stage and exhaust said bypass flow to pass through said turbine second stage,
i. bypass valve means to control the amount of flow bypassed through said turbine bypass means,
j. engine control means operatively connected to said fuel injection and ignition means and to said bypass valve means, in a manner to control the amount of fuel directed to said fuel injection and ignition means and to control said bypass valve means in a manner to control the amount of bypass flow through said turbine bypass means,
k. said turbine stages and said compressor sections being matched in a manner that with said engine operating at subsonic cruise velocity, with said compressor sections each operating at maximum compression ratio, and with said bypass valve means positioned so that there is substantially no flow through said turbine bypass means, the turbine first stage and the turbine second stage each has a flow area sized to allow gaseous flow therethrough at the speed of sound in said gaseous flow,
l. said engine control means being arranged to set said bypass valve means at a more open position at higher engine thrust settings where higher temperatures are created in said combustion chamber, and to set said bypass valve means at a more closed position at lower engine thrust settings where lower temperatures are created in said combustion chamber, in a manner that there is substantially constant corrected gaseous flow into said turbine, said corrected flow being measured according to the formula:

$$\text{corrected gaseous flow} = \frac{W\sqrt{\theta_t}}{\delta_t}$$

where:
W = Total Mass Flow Rate in lbs. per second
$\theta_t$ = Observed temperature (absolute) divided by standard temperature (518.67° R)
$\delta_t$ = Observed pressure divided by standard pressure (2116.22 lbs./sq. ft.)

whereby during subsonic cruise said engine can operate at a relatively low specific fuel consumption with high compression ratio and low combustion exit temperature, in a condition where said valve bypass means is at a substantially closed position, during high power acceleration mode said engine can operate at high combustion exit temperatures in a condition where said valve bypass means is in a more open position to maintain constant corrected flow through said turbine to satisfy the turbine requirements, and during supersonic cruise mode the engine can operate efficiently at relatively high combustion exit temperatures.

2. The engine as recited in claim 1, wherein the nozzle area of the turbine is sized to correspond approximately to the value derived from the following formula, where the engine is operating at subsonic cruise and said bypass valve means is closed, said formula being:

$$\text{corrected gaseous flow} = \frac{W\sqrt{\theta_t}}{\delta_t}$$

where:
W = Total Mass Flow Rate in lbs. per second
$\theta_t$ = Observed temperature (absolute) divided by standard temperature (518.67° R)
$\delta_t$ = Observed pressure divided by standard pressure (2116.22 lbs./sq. ft.)

3. The engine as recited in claim 1, wherein said turbine bypass means comprises passageway means positioned radially outwardly of said turbine first stage and arranged to discharge bypass flow in a coannular pattern into flow from said first turbine stage.

4. The engine as recited in claim 1, wherein said turbine bypass means comprises bypass inlet means located immediately downstream of said compressor, said bypass inlet means arranged to direct a selected portion of air from said compressor into said turbine bypass means.

5. The engine as recited in claim 1, wherein said turbine bypass means comprises passageway means having an inlet end located relative to said combustion chamber to receive gaseous flow from said combustion chamber as at least part of said bypass flow.

6. The engine as recited in claim 1, wherein said inlet end is located in a manner that the bypass flow comprises both combustion flow from said combustion chamber and air from said compressor in a proportion that temperature of said bypass flow generally matches temperature of the gaseous flow from the turbine first stage.

7. The engine as recited in claim 6, wherein the temperature of the bypass flow is within about 300° F. of the temperature of the gaseous flow from the turbine first stage.

8. The engine as recited in claim 1, wherein said turbine bypass means comprises a plurality of generally longitudinally extending tubes arranged circumferentially around said turbine.

9. The engine as recited in claim 8, wherein said turbine bypass means comprises a bypass inlet means located immediately downstream of said compressor so as to direct a selected portion of air from said compressor into said turbine bypass means.

10. The engine as recited in claim 8, wherein said turbine bypass means comprises passageway means having an inlet end located relative to said combustion chamber to receive gaseous flow from said combustion chamber as at least part of said bypass flow.

11. The engine as recited in claim 10, wherein said inlet end is located in a manner that the bypass flow comprises both combustion flow from said combustion chamber and air from said compressor in a proportion that temperature of said bypass flow generally matches temperature of the gaseous flow from the turbine first stage.

12. The engine as recited in claim 11, wherein the temperature of the bypass flow is within about 300° F. of the temperature of the gaseous flow from the turbine first stage.

13. In a supersonic jet engine adapted to cruise at supersonic speeds at a relatively high efficiency, to operate with high turbine inlet temperatures for high power operation, and to cruise subsonically with a relatively low specific fuel consumption, said engine comprising:
   a. a housing structure having an upstream inlet end to receive intake air, and a downstream exhaust end to discharge jet exhaust,
   b. an air inlet arranged to receive intake air at subsonic velocity and also to receive intake air at surpersonic velocities and reduce said air to subsonic velocity,
   c. a compressor mounted in said housing rearwardly of said inlet and arranged to compress air flowing into said inlet, said compressor having a first compressor section and a second compressor section, each having an inlet end and an outlet end arranged to operate between a maximum compression ratio and a minimum compression ratio,
   d. means defining a combustion chamber mounted in said housing downstream of said compressor to receive compressed air therefrom,
   e. fuel injection and ignition means in said combustion chamber arranged to burn fuel in airflow from the compressor and provide a gaseous flow from said combustion chamber,
   f. a turbine mounted in said housing rearwardly of said combustion chamber and arranged to receive said gaseous flow from the combustion chamber, said turbine having a first stage operatively connected to the compressor second section, and a second stage operatively connected to the compressor first section adapted to receive gaseous flow from said first stage, each of said first and second turbine stage having a predetermined cross-sectional nozzle area through which said gaseous flow passes to pass rearwardly through a primary exhaust passageway,
   g. an exhaust nozzle to receive gaseous flow from said turbine and exhaust said flow to produce a thrust,
   h. turbine bypass means to receive flow from a location downstream of said compressor as bypass flow, to direct said bypass flow along a path bypassing said turbine first stage and exhaust said bypass flow to pass through said turbine second stage,
   i. bypass valve means to control the amount of flow bypassed through said turbine bypass means,
   j. engine control means operatively connected to said fuel injection and ignition means and to said bypass valve means, in a manner to control the amount of fuel directed to said fuel injection and ignition means and to control said bypass valve means in a manner to control the amount of bypass flow through said turbine bypass means, a method of operating said jet engine, said method comprising: controlling the amount of fuel directed to said fuel injection and ignition means and controlling said bypass valve means in a manner to control the amount of bypass flow through said turbine bypass means so that said bypass valve means is at a more open position at higher engine thrust settings where higher temperatures are created in said combustion chamber, and at a more closed position at lower engine thrust settings where lower temperatures are created in said combustion chamber, in a manner that there is substantially constant corrected gaseous flow into said turbine, and said bypass flow is directed through said turbine second stage, said corrected flow being measured according to the formula:

$$\text{corrected gaseous flow} = \frac{W\sqrt{\theta_t}}{\delta_t}$$

where:
   W=Total Mass Flow Rate in lbs. per second
   $\theta_t$=Observed temperature (absolute) divided by standard temperature (518.67° R)
   $\delta_t$=Observed pressure divided by standard pressure (2116.22 lbs./sq. ft.)

whereby during subsonic cruise said engine can operate at a relatively low specific fuel consumption with high compression ratio and low combustion exit temperature, in a condition where said valve bypass means is at a substantially closed position, during high power acceleration mode, said engine can operate at high combustion exit temperatures in a condition where said valve bypass means is in a more open position to maintain constant corrected flow through said turbine to satisfy the turbine requirements, and during supersonic cruise mode the engine can operate efficiently at relatively high combustion exit temperatures.

14. The method as recited in claim 13, further comprising directing said bypass flow radially outwardly of said turbine first stage and discharging said bypass flow in a coannular pattern with respect to gaseous discharge from said turbine first stage.

15. The method as recited in claim 13, further comprising directing air from a location immediately downstream of said compressor into said turbine bypass means.

16. The method as recited in claim 13, further comprising directing gaseous flow into said turbine bypass means from a location relative to said combustion chamber, in a manner that at least part of said bypass flow is gaseous flow from said combustion chamber.

17. The method as recited in claim 16, wherein said bypass flow is derived from both air flow from said compressor and from gaseous flow from said combustion chamber in a proportion such that temperature of the bypass flow generally matches temperature of the gaseous flow from the turbine first stage.

18. The method as recited in claim 17, wherein the temperature of the bypass flow is within about 300° F. of the temperature of gaseous flow from the turbine first stage.

19. The method as recited in claim 13, further comprising directing bypass flow through a plurality of generally longitudinally extending tubes arranged circumferentially around said turbine first stage.

20. The method as recited in claim 19, further comprising directing gaseous flow into said turbine bypass means from a location relative to said combustion chamber, in a manner that at least part of said bypass flow is gaseous flow from said combustion chamber.

21. The method as recited in claim 20, wherein said bypass flow is derived from both air flow from said compressor and from gaseous flow from said combustion chamber in a proportion such that temperature of the bypass flow generally matches temperature of the gaseous flow from the turbine first stage.

22. The method as recited in claim 21, wherein the temperature of the bypass flow is within about 300° F. of the temperature of gaseous flow from the turbine first stage.

* * * * *